United States Patent [19]

Choi

[11] Patent Number: 4,809,136
[45] Date of Patent: Feb. 28, 1989

[54] CONDENSER WITH A SECURING RING

[75] Inventor: Yong-Kyu Choi, Kyungki-do, Rep. of Korea

[73] Assignee: Dae Yeong Co., Ltd., Kyungki-do, Rep. of Korea

[21] Appl. No.: 181,042

[22] Filed: Apr. 13, 1988

[30] Foreign Application Priority Data

Apr. 20, 1987 [KR] Rep. of Korea ............... 5673/1987

[51] Int. Cl.⁴ .............................................. H01G 9/00
[52] U.S. Cl. .................................................. 361/519
[58] Field of Search ........................ 361/433; 29/570.1

[56] References Cited

U.S. PATENT DOCUMENTS

| 2,073,880 | 3/1937 | Robinson | 361/433 X |
| 2,957,041 | 10/1960 | Ziegler | 361/433 X |
| 3,197,547 | 7/1965 | Peace et al. | 361/433 X |
| 3,475,658 | 10/1969 | Howard et al. | 361/433 |
| 3,522,489 | 8/1970 | Sparrow et al. | 361/433 |
| 3,644,796 | 2/1972 | Carino | 361/433 |
| 3,648,337 | 3/1972 | Greskamp et al. | 361/433 X |
| 3,803,457 | 4/1974 | Yamamoto | 361/433 |

Primary Examiner—Donald A. Griffin
Attorney, Agent, or Firm—Finnegan, Henderson, Farabow, Garrett & Dunner

[57] ABSTRACT

An improved electrolytic condenser comprising a cylindrical housing and a lid having an aperture, and a securing ring fitted into the opening of the housing by means of ultrasonic welding process or threaded engagement. In case of an inadmissibly high gas pressure in the condenser, through the aperture of the lid the excess gas will be discharged, thus the condenser being rendered explosion-proof and also the assembling process being shortened by the provision of the securing ring.

2 Claims, 1 Drawing Sheet

CONDENSER WITH A SECURING RING

BACKGROUND OF THE INVENTION

The present invention relates to an electrolytic condenser and more particularly, to a securing ring by which the lid of the condenser can be fixedly retained in the housing, while at the same time, being rendered explosion-proof and curtailing the assembling process.

The known condenser comprises a cylindrical housing which is closed on the lower side by a bottom portion which is integral with a wall portion. The housing is closed on the upper side by a disc-like lid having a rubber layer thereon, and the lid is fixedly retained in the housing by way of a crimped end edge via a sealing rubber ring between the lid and the crimped end edge in order that the condenser is sufficiently sealed to contain the electrolyte therein.

However, the above-mentioned condenser has a drawback in that the housing requires a separate process for crimping the upper end edge.

Further drawback exists in that an unexpected accident such as explosion would be often occurred in the housing due to the expansion of the electrolyte or the excess gas pressure caused by electric over current, thus the lid and the sealing rubber ring being sprung out of the housing.

SUMMARY OF THE INVENTION

With a view to solving the above-described problems, it is an objective of the present invention to provide a condenser with a securing ring which keeps the lid closing in the proper position without the crimping process of the upper end edge of the housing made of nonflammable and noncombustible synthetic resin.

It is another objective of the present invention to provide a condenser with a securing ring which the lid having a rubber layer could not be sprung out of the housing even if the explosion may be occurred in the housing.

To this end, a condenser with a securing ring in accordance with the present invention is characterized in that a housing containing wax and electrolyte therein, a lid having a rubber layer thereon, provided a pair of terminals thereon and to be closed the opening of the housing, wherein the improvement comprises a securing ring in the form of a sleeve forming a stepped end in the lower portion thereof for fixedly securing the lid, an aperture provided on the center portion of the lid, and fastening means engaged between the outer surface of the stepped end and the opening of the housing by means of ultrasonic welding process.

In another preferred embodiment, the fastening means engaged between the outer surface of the stepped end and the opening of the housing is the threaded engagement with each other.

Other novel features and advantages of the invention will become apparent in the course of the following detailed description taken together with the accompanying drawings, which are directed only to the understanding of the present invention and not to the restriction of the scope of the invention.

DESCRIPTION OF THE PREFERRED EMBODIMENTS

Figure 1:
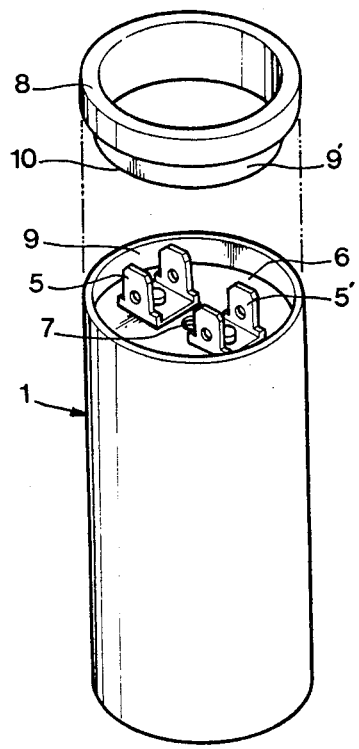
FIG. 1 is an exploded perspective view of an electrolytic condenser with a securing ring showing a preferred embodiment of the present invention.
Figure 2:
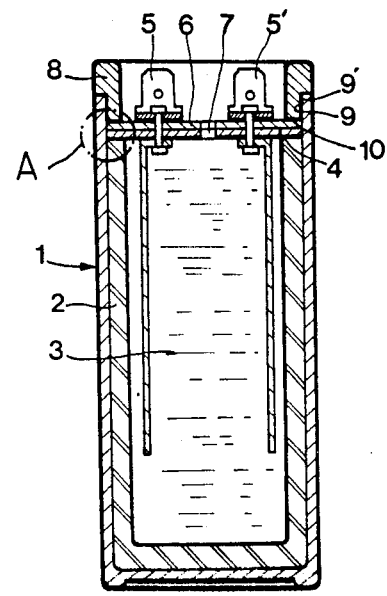
FIG. 2 is a longitudinal sectional view of the present invention.
Figure 3:
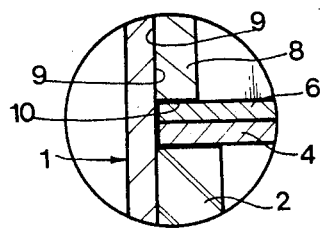
FIG. 3 is an enlarged fragmentary sectional view taken substantially from "A" portion of FIG. 2.

Referring now to the drawings, and particularly FIGS. 1–3, a preferred embodiment of the inventive condenser is generally installed on a base board, chassis or circuit board.

An electrolytic condenser includes a housing 1 made of nonflammable and noncombustible synthetic resin in which contains wax 2 and electrolyte 3, and a lid 4 having a rubber plate 6 thereon and a pair of terminals 5 and 5' provided on the center portion thereof.

An improvement of the condenser comprises an aperture 7 formed on the center portion of the lid 4 having the rubber plate 6 thereon, and a securing ring 8 in the form of a sleeve which includes a stepped end 10 having an outer surface 9' thereof.

The stepped end 10 of the securing ring 8 is inserted into the opening of the housing 1 so that the stepped end 10 facilitates to press down the rubber plate 6 affixed on the lid 4 into the proper position, and the ultrasonic welding process is performed between the outer surface 9' of the stepped end 10 and the inner surface 9 of the opening of the housing 1 for a reliable joint with each other.

Figure 4:
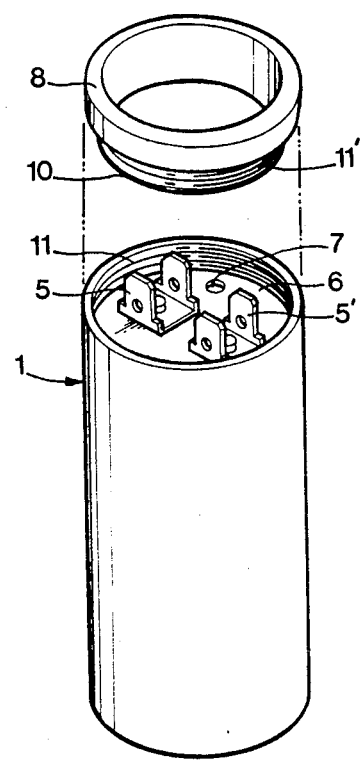
FIG. 4 is an exploded perspective view of an electrolytic condenser with a securing ring showing another preferred embodiment of the present invention.

FIG. 4 is an exploded perspective view depicting another preferred embodiment of a condenser with a securing ring according to the invention, in which like references characteristics designate like parts of the embodiment shown in FIGS. 1–3.

Threaded portions 11 and 11' are provided respectively on the outer surface 9' of the stepped end 10 and the inner surface 9 of the opening of the housing 1 so that the securing ring 8 is fitted into the opening of the housing 1 in threaded engagement with each other.

As a result of the fact that the ultrasonic welding joint shown in FIGS. 1–3 or the threaded engagement shown in FIG. 4 between the securing ring 8 and the opening of the housing 1 is forced to retain the lid 4 having the rubber plate 6 thereon which includes the aperture 7, the explosive power occurred by the excess gas pressure and the expansion of the electrolyte due to electric over current in the housing 1 can be discharged from the aperture 7.

Thus, the protection against the breakage of the housing 1 and the lid 4 is achieved.

Therefore, the crimping process of the upper end edge of the housing 1 is not necessary for the condenser in accordance with the present invention.

Furthermore, the stepped end 10 of the securing ring 8 is effected to support the lid 4 and the aperture 7 of the lid 4 serves as an outlet hole for the excess gas occurred in the housing 1, thus preventing the condenser in accordance with the present invention from breaking the housing 1 and the lid 4 even if the explosion may be arisen in the condenser.

While the preferred embodiments of the present invention have been described above, it should be understood that various modifications may be made herein without departing the spirit of the invention and scope of the appended claims.

What is claimed is:

1. An improved condenser including a housing containing wax and electrolyte therein, a lid having a rubber plate thereon, provided a pair of terminals thereon and to be closed an opening of said housing, wherein the improvement comprises a securing ring in the form of a sleeve forming a stepped end in the lower portion thereof for fixedly securing said lid, an aperture provided on the center portion of said lid, and fastening means engaged between the outer surface of said stepped end and the opening of said housing by means of ultrasonic welding process.

2. An improved condenser as claimed in claim 1, wherein fastening means further comprises the threaded engagement between the outer surface of said stepped end of said securing ring and the opening of said housing.

* * * * *